(No Model.)
P. M. MISHLER.
HEDGE.
No. 380,448. Patented Apr. 3, 1888.
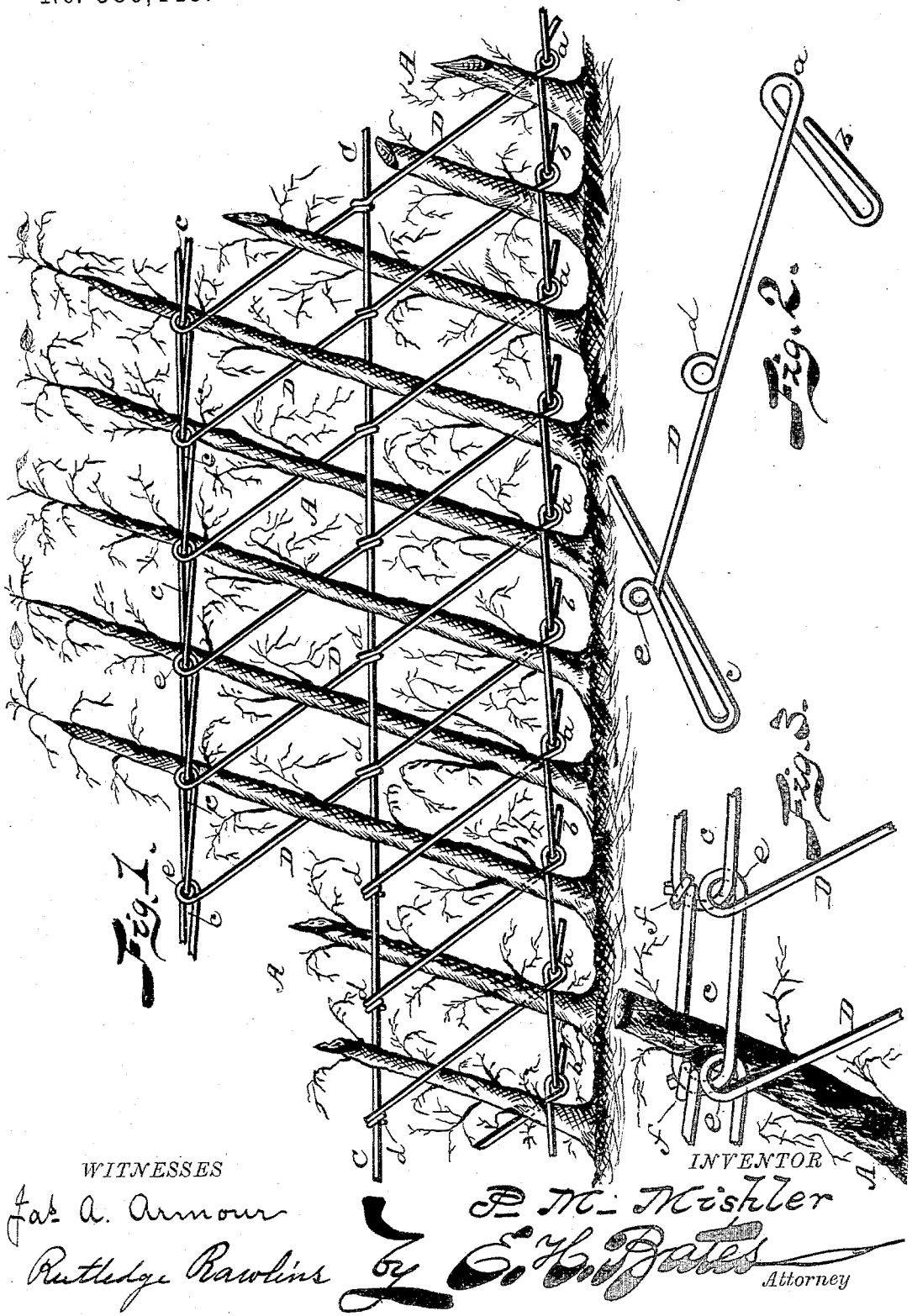
WITNESSES
Jas. A. Armour
Rutledge Rawlins
INVENTOR
P. M. Mishler
by E. H. Bates
Attorney

United States Patent Office.

PHARES M. MISHLER, OF HAGERSTOWN, MARYLAND.

HEDGE.

SPECIFICATION forming part of Letters Patent No. 380,448, dated April 3, 1888.

Application filed December 17, 1887. Serial No. 258,192. (No model.)

*To all whom it may concern:*

Be it known that I, PHARES M. MISHLER, a citizen of the United States, residing at Hagerstown, in the county of Washington and State of Maryland, have invented certain new and useful Improvements in Hedges; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a new and improved fence, which belongs to that class of fences wherein oblique stalks of a hedge are plashed to horizontal wires, forming a combination of tie and plashing wires which constitute a plashing hedge or living fence, as will be fully understood from the following description, when taken in connection with the annexed drawings, in which—

Figure 1 represents a front view of my improved hedge or fence. Fig. 2 is a perspective view of the plashing-wire D; and Fig. 3 is a detail perspective view of the wires connected to one another, showing the loop through which the stalk projects.

Referring by letter to the accompanying drawings, A designates the stalks of a hedge rising obliquely from the ground. These stalks are loosely connected by oppositely-inclined oblique wires D, of peculiar construction, which I will now describe.

It will be observed that each individual oblique tie-wire D is bent at its lower end to form an eye, $a$, and by a simple continuation of the lower end of each wire it is interlocked with the adjacent eye of its fellow wire. It will also be observed that the terminal portions of the wires D form hooks $b$. I thus make a compound base tie, which serves, also, as the horizontal base wire or rail for the hedge. The upper ends of the oblique wires D are bent to form an eye, $e$, and long loops $c$, through which the upper portions of the oblique stalks of the hedge pass freely, and which are held loosely therein, the backward pressure of said stalks being supported by the end of the loop, thus retaining said stalks in an inclined position.

It will be seen that, in connecting the upper portion of the wires D to one another, the end of the loop portion $c$ of said wires is carried through the eyes $e$ of the adjacent wires D, thence around the stalk, and finally tied to the loop, as shown at $f$, Fig. 3 of the drawings.

The intermediate horizontal wire, C, of the hedge is connected to the tie or plashing wires by passing through the eye $d$ in the central portion of the plashing-wires D, which latter are plashed in and out between the oblique stalks, as shown in Fig. 1 of the drawings.

It will be seen that I plash and tie by links or a continuous connection of each individual oblique wire, which has an eye and hook at its lower end, and at their upper ends they are bent into loops and are interlocked, allowing free play to the stalks, which pass through said loops, and said stalks are free to grow, and at no point are they bound to the wires.

A fence or hedge thus constructed is durable, easily built, and at the same time inexpensive.

Having thus described my invention, what I claim as new is—

In a hedge fence, the combination, with the inclined plants, of the oppositely-inclined plashing-wires D, each provided midway its length with the eye $d$, bent at one end to form the eye $a$ and loop $b$ and at the opposite end to form the eye $e$ and loop $c$, and the horizontal wire C, passing through the eyes $d$, the upper and lower loops of the plashing-wires being interlocked to form the upper and lower rails of the hedge, substantially as described.

In testimony whereof I affix my signature in presence of two witnesses.

PHARES M. MISHLER.

Witnesses:
 GEO. WATSON,
 D. P. NEWCOMER.